2,847,432
Patented Aug. 12, 1958

2,847,432

PRODUCTION OF CHEMICALS

Thomas R. Steadman, Waban, and John O. H. Peterson, Jr., Medford, Mass., assignors to National Research Corporation, Cambridge, Mass., a corporation of Massachusetts No Drawing. Application April 23, 1956
Serial No. 579,759

5 Claims. (Cl. 260—406)

This invention relates to the production of chemicals and in particular to the production of acids.

A principal object of the present invention is to provide a process for producing dicarboxylic acids from castor oil.

Another object of the present invention is to provide a process for producing dicarboxylic acids from esters of ricinoleic acid.

Another object of the invention is to provide a process for producing dicarboxylic acids from esters of 12-ketostearic acid.

Still another object of the invention is to provide a process for producing acid mixtures comprised essentially of dodecanedioic and undecanedioic acids from methyl 12-ketostearate.

Other objects of the invention will in part be obvious and will in part appear hereinafter.

The invention accordingly comprises the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description.

Castor oil, a plentiful and cheap commodity, is comprised essentially of ricinolein, i. e., the glyceride of ricinoleic acid. Ricinoleic acid or esters thereof contain both a hydroxy group and an unsaturated group. By the present invention, it is possible to obtain from ricinoleic acid and esters thereof the valuable dicarboxylic acids containing eleven and twelve carbon atoms and the valuable monocarboxylic acids containing six and seven carbon atoms. Thus, in the present invention, castor oil or a ricinoleate is isomerized to produce a 12-ketostearate which is then oxidatively cleaved to a mixture of long-chain mono- and dicarboxylic acids. The isomerization of a ricinoleate is preferably carried out in the presence of an inert support carrying a catalyst selected from the group consisting of palladium, platinum, rhodium and ruthenium and at a temperature between 200° C. and 300° C. The reaction is also preferably carried out in a closed system. It has been found that substantially higher yields of ketostearate over that reported in the prior art can be obtained from the ricinoleate by operating in the above manner.

The ester of 12-ketostearic acid formed by the above isomerization reaction is then subjected to an oxidative cleavage to produce a mixture comprised essentially of mono- and dicarboxylic acids. This acid mixture comprises a dicarboxylic acid, dodecanedioic acid, which contains the same number of carbon atoms between the carboxyl groups as the number of carbon atoms between the keto group and the carboxyl group of the 12-ketostearate starting material and a dicarboxylic acid, undecanedioic acid, which contains one less carbon atom than the first-mentioned dicarboxylic acid. There are also present the corresponding lower monocarboxylic acids, caproic and enanthic acids, from the other portion of the molecule being oxidized. These volatile monobasic acids are very useful in the manufacture of plasticizers.

The production of the desired dicarboxylic acids is preperably achieved by cleaving an ester of 12-ketostearic acid with nitric acid at a temperature between about 60° C. and 120° C. In one preferred embodiment of the invention, the ester is methyl 12-ketostearate obtained from the isomerization of methyl ricinoleate and the dicarboxylic acids produced therefrom are dodecanedioic and undecanedioic acids. Another preferred embodiment of the invention calls for the cleavage reaction to be carried out in the presence of a mixed catalyst containing a copper-bearing material and a compound of vanadium. The copper-bearing material may be either elemental copper or a compound of copper such as copper nitrate. The preferred catalysts contain ammonium vanadate and elemental copper or ammonium vanadate and copper nitrate. When used in the specification and claims, copper-bearing material is restricted to include either elemental copper or a suitable compound of copper.

The long-chain dicarboxylic acids, dodecanedioic and undecanedioic acids, and their derivatives have considerable utility. For instance, some of the esters of these acids may be used as synthetic lubricants or as plasticizers. The acids produced by the present invention also provide valuable chemical intermediates for the manufacture of resins such as polyesters and the like.

Specific detailed methods for practicing the isomerization step of the present invention are set forth in the following two non-limiting examples.

*Example I*

A mixture of 425 grams of methyl ricinoleate and 50 grams of a catalyst consisting of about 5 per cent palladium on carbon was maintained at a temperature of between about 258° C. and 268° C. for a period of 2.5 hours in a closed stainless steel autoclave. A maximum internal pressure of 400 p. s. i. g. was attained during the isomerization reaction. After the catalyst was filtered from the reaction mixture, there was recovered from the reaction mixture a quantity of methyl 12-ketostearate which represented a yield of about 75 percent.

*Example II*

A mixture of 800 grams of methyl ricinoleate and 80 grams of a catalyst consisting of about 5 percent palladium on carbon was maintained at a temperature of between about 250° C. and 253° C. for a period of 2.5 hours in a closed glass-lined rocking autoclave. A maximum internal pressure of about 200 p. s. i. g. was attained during the reaction. After the catalyst was filtered from the reaction mixture, there was recovered from the reaction mixture a quantity of methyl 12-ketostearate which represented a yield of about 86.7 percent.

The isomerization of a ricinoleate proceeds as follows:

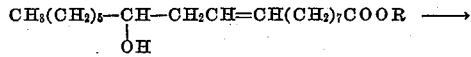

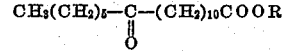

where R represents a $CH_3$, $-C_2H_5$, $-C_6H_5$ or like group. The glycerides of ricinoleic acid also proceed as above.

The above reaction preferably takes place at a temperature between 200° C. and 300° C. and in the presence of a catalyst selected from the platinum group. Catalysts such as palladium, platinum, rhodium, or ruthenium supported on inert carriers such as carbon, silica or alumina are quite effective and satisfactory in the isomerization reaction. Catalyst supports containing on the order of about 5 percent by weight of the desired catalyst are preferable for the reaction. However, somewhat greater or lesser proportions of catalytically active metal can be employed.

It has been found that much higher yields than those reported in the prior art are obtained when the isomerization is performed or carried out using the preferred catalysts in an enclosed system. In the present invention, the isomerization is carried out in a closed system and thus essentially under increased pressures, since autogenous pressures in excess of atmospheric are attained during the reaction. The reaction can also be carried out by putting the system under a positive pressure of, for example, 400 p. s. i. of an inert gas and maintaining this pressure throughout the run. Alternatively the system can be put under a positive pressure of, for example, 100 p. s. i. and the pressure allowed to build up during the reaction.

It is obvious that the isomerization reaction can also be carried out by passing the ricinoleyl ester at the specified temperature through a fixed bed of catalyst in tablet form. The greater concentration of catalyst under such circumstances would be expected to lead to a faster reaction than has been encountered in using only a 10 percent concentration of catalyst.

An ester of 12-ketostearic acid, when treated under certain conditions with nitric acid, undergoes a combined oxidation and cleavage at the keto group. Thus, for example, the oxidation and cleavage of methyl 12-ketostearate yields a mixture of products containing two dicarboxylic acids and two monocarboxylic acids. This reaction is summarized by the following equations:

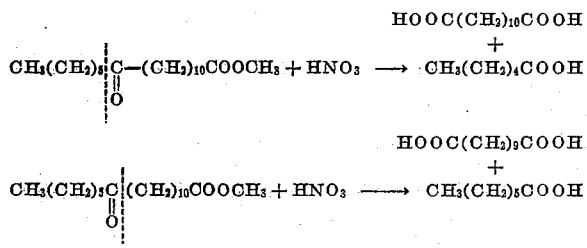

The dotted lines indicate the points at which the oxidation and cleavage occurs. Since it is difficult to control the selectivity of the point of oxidation and cleavage, a mixture of two dicarboxylic and two monocarboxylic acids will be obtained.

The cleavage reaction, in order to obtain good conversion and yields under controlled conditions, is carried out in the presence of a mixed catalyst which contains either elemental copper or a suitable compound of copper and a compound of vanadium. The preferred catalysts have been found to be mixtures of ammonium vanadate and elemental copper and mixtures of ammonium vanadate and copper nitrate. The quantity of vanadium compound employed may vary between about 0.01 to 0.5 percent based on the weight of the nitric acid. The preferred quantity is on the order of about 0.1 percent. The quantity of copper-bearing material such as elemental copper employed may vary between about 0.01 and 1.0 percent based on the weight of the nitric acid. The preferred quantity is at least 2.5 times the quantity of vanadium compound employed. Thus, in the preferred catalyst mixtures, when 0.1 percent ammonium vanadate is employed, the quantity of elemental copper or copper nitrate is preferably 0.25 percent.

A specific detailed method of practicing the oxidative cleavage step of the present invention is set forth in the following non-limiting example.

*Example III*

0.10 mole of methyl 12-ketostearate formed in Example I was added, over a period of 8 minutes, to a stirred mixture consisting of 2.00 moles of a 70 percent nitric acid solution, 0.18 gram of ammonium vanadate and 0.45 gram of copper maintained at a temperature on the order of about 110° C. The mole ratio of nitric acid to methyl 12-ketostearate was about 20:1. Upon completion of the addition, the resulting mixture was stirred for an additional 30 minutes at 40° C., at the end of which time the reaction mixture was added to one liter of cold water. The precipitated undecanedioic and dodecanedioic acids were removed by filtration and washed with water until the water washings were neutral. 12.8 grams of a mixture of dicarboxylic acids (undecanedioic and dodecanedioic acids) were recovered, which represented a yield of about 51.7 percent. Also recovered were the monocarboxylic acids, caproic and enanthic acids.

Nitric acid solutions with an $HNO_3$ concentration of between 50 to 100 percent by weight may be employed in the oxidative cleavage reaction. The use of nitric acid solutions with an $HNO_3$ concentration of 70 percent by weight is preferred. The nitric acid is used in excess of the theoretical quantity required to completely react with the ester starting material. Mole ratios of nitric acid to starting material ester may vary from about 5:1 to about 30:1. As used in the specification and claims, nitric acid solutions will refer not only to aqueous solutions but also to 100 percent nitric acid.

The range of operating temperatures is preferably maintained between about 60° C. and 120° C. Temperatures above 120° C. are undesirable, since there would be required equipment for maintaining superatmospheric pressures. This would increase the cost of the equipment for carrying out the reaction on a large scale.

The time required for completion of the reaction is quite short, since the oxidative cleavage of the esters of 12-ketostearic acid takes place very rapidly. Although the example illustrates only a batch reaction, the reaction can be carried out on a continuous basis due to the short reaction time. The reaction time must be necessarily of short duration, since excessive exposure or contact of the product acids with the oxidizing solution results in some product degradation.

Since certain changes may be made in the above process without departing from the scope of the invention herein involved, it is intended that all matter contained in the above description shall be interpreted as illustrative and not in a limiting sense.

What is claimed is:

1. A process for oxidizing an alkyl ester of 12-ketostearic acid which comprises reacting said compound with a nitric acid solution in the presence of a mixed catalyst containing a copper-bearing material and a compound of vanadium.

2. The process of claim 1 wherein the copper-bearing material is elemental copper and the compound of vanadium is ammonium vanadate.

3. The process of claim 1 wherein the copper-bearing material is copper nitrate and the compound of vanadium is ammonium vanadate.

4. A process for preparing dicarboxylic acids from an alkyl ester of 12-ketostearic acid which comprises reacting said ester with a nitric acid solution having an $HNO_3$ concentration in excess of 50 percent by weight in the presence of a mixed catalyst containing a copper-bearing material and a compound of vanadium at a temperature of between about 60° C. and 120° C. and recovering from the resulting reaction mixture an acid mixture containing dodecanedioic and undodecanedioic acids.

5. The process of claim 4 wherein said alkyl ester of 12-ketostearic acid is methyl 12-ketosteate.

References Cited in the file of this patent

UNITED STATES PATENTS

| | | |
|---|---|---|
| 2,118,567 | Milas et al. | May 24, 1938 |
| 2,178,760 | Lazier | Nov. 7, 1939 |
| 2,340,745 | Hanford et al. | Feb. 1, 1944 |
| 2,365,290 | Price et al. | Dec. 19, 1944 |
| 2,426,954 | Sprules et al. | Sept. 2, 1947 |

OTHER REFERENCES

Asahina et al.: J. Pharm. Society Japan, 49, 1017–24 (1929), cited in Chemical Abstracts, 24, 1346 (1930).